(12) United States Patent
Surti et al.

(10) Patent No.: US 9,466,090 B2
(45) Date of Patent: Oct. 11, 2016

(54) SUBSET BASED COMPRESSION AND DECOMPRESSION OF GRAPHICS DATA

(71) Applicants: Prasoonkumar Surti, Folsom, CA (US); Tomas G. Akenine-Moller, Lund (SE); Jon N. Hasselgren, Bunkeflostrand (SE); Carl J. Munkberg, Malmö (SE); Jim. K. Nilsson, Lund (SE)

(72) Inventors: Prasoonkumar Surti, Folsom, CA (US); Tomas G. Akenine-Moller, Lund (SE); Jon N. Hasselgren, Bunkeflostrand (SE); Carl J. Munkberg, Malmö (SE); Jim. K. Nilsson, Lund (SE)

(73) Assignee: INTEL CORPORATION, Santa Clara, CA (US)

( * ) Notice: Subject to any disclaimer, the term of this patent is extended or adjusted under 35 U.S.C. 154(b) by 306 days.

(21) Appl. No.: 13/922,404

(22) Filed: Jun. 20, 2013

(65) Prior Publication Data

US 2014/0375665 A1   Dec. 25, 2014

(51) Int. Cl.
*G06T 1/60* (2006.01)
*G06T 11/40* (2006.01)
*G06T 9/00* (2006.01)

(52) U.S. Cl.
CPC .................. *G06T 1/60* (2013.01); *G06T 9/005* (2013.01); *G06T 11/40* (2013.01)

(58) Field of Classification Search
CPC ...................................................... G06T 1/60
USPC .................................................. 345/422, 555
See application file for complete search history.

(56) References Cited

U.S. PATENT DOCUMENTS 6,049,630 A   4/2000  Wang et al.
6,078,619 A * 6/2000  Monro ................. H04N 19/503
                                                    375/240
6,285,790 B1  9/2001  Schwartz
6,535,633 B1  3/2003  Schweid et al.

(Continued)

FOREIGN PATENT DOCUMENTS

JP    2001-298652 A    10/2001
JP    2008-510357 A    4/2008

(Continued)

OTHER PUBLICATIONS

International Search Report and Written Opinion received for PCT Patent Application No. PCT/US2014/041622, mailed on Oct. 27, 2014, 9 pages.

(Continued)

*Primary Examiner* — Jacinta M Crawford
*Assistant Examiner* — Shivang Patel
(74) *Attorney, Agent, or Firm* — Lynch Law Patent Group, P.C.

(57) ABSTRACT

Techniques related to graphics rendering including techniques for compression and/or decompression of graphics data by use of indexed subsets are described. In one example, compression in graphics rendering may include determining a plurality of color values associated with individual pixels of a tile of pixels, generating a subset of the plurality of color values such that the subset of the plurality of color values include one or more distinct color values from the plurality of color values, associating an index value with each color value of the subset of the plurality of color values, determining, for each of the individual pixels, an associated pixel index value to generate a plurality of pixel index values associated with the individual pixels of the tile of pixels, storing, in memory, graphics data including the subset of the plurality of color values, the associated index values, and the plurality of pixel index values.

21 Claims, 9 Drawing Sheets

(56) References Cited

U.S. PATENT DOCUMENTS

| | | |
|---|---|---|
| 2006/0103658 A1 | 5/2006 | Liao |
| 2009/0219993 A1* | 9/2009 | Bronstein ............ H04N 19/61 375/240.03 |
| 2011/0243469 A1 | 10/2011 | McAllister |
| 2012/0183215 A1* | 7/2012 | Van Hook et al. .......... 382/166 |

FOREIGN PATENT DOCUMENTS

| | | |
|---|---|---|
| JP | 2009-044722 A | 2/2009 |
| WO | 99/22519 A2 | 5/1999 |
| WO | 02-07426 A2 | 1/2002 |
| WO | 2009-124248 A1 | 10/2009 |
| WO | 2010-141927 | 12/2010 |

OTHER PUBLICATIONS

International Preliminary Report on Patentability for PCT Patent Application No. PCT/US2014/041481, mailed on Oct. 20, 2014, 2014, 9 pages.

International Preliminary Report on Patentability for PCT Patent Application No. PCT/US2014/041622, mailed on Dec. 30, 2015, 5 pages.

Second Office Action for Japanese Patent Application No. 2015-514317, mailed May 31, 2016, 3 pages.

Pourazad, et al., "An Efficient Low Random-Access Delay Panorama-Based Multiview Video Coding Scheme", 16th IEEE International Conference on Image Processing (ICIP 2009), IEEE, Nov. 2009, pp. 2945-2948.

Li, et al., "Panorama-Based Multi-View Video Coding", Intemaional Conference on Audio, Language and Image Processing (ICALIP 2008), IEEE Jul. 2008, pp. 375-379.

* cited by examiner

800

```
┌─────────────────────────────────────┐
│      Access Graphics Data           │
│              802                    │
└─────────────────────────────────────┘
                  │
                  ▼
┌─────────────────────────────────────┐
│     Determine a Subset of Values    │
│              804                    │
└─────────────────────────────────────┘
                  │
                  ▼
┌─────────────────────────────────────┐
│ Determine Index Values associated with the Subset of Values │
│              806                    │
└─────────────────────────────────────┘
                  │
                  ▼
┌─────────────────────────────────────┐
│ Determine Pixel Index Values based on The Graphics Data │
│              808                    │
└─────────────────────────────────────┘
                  │
                  ▼
┌─────────────────────────────────────┐
│ Determine Pixel Values for Individual Pixels of a Tile of Pixels │
│ based on Subset Values and the Pixel Index Values │
│              810                    │
└─────────────────────────────────────┘
```

FIG. 8

SUBSET BASED COMPRESSION AND DECOMPRESSION OF GRAPHICS DATA

BACKGROUND

In general, graphics rendering may generate an image or images from model data using a wide range of computer implemented techniques. In some graphics rendering implementations, an image may be rendered using rasterization by sampling different functions such as, for example, a visibility function (e.g., a function to determine whether a sample point is inside a triangle) and/or a shading function (e.g., a function to determine the color at a certain sample point), or the like. In general, the samples for a visibility function may be termed visibility samples and the samples for a shading function may be termed shading samples.

In some implementations, such as, for example, super-sampling anti-aliasing (SSAA) applications, the number of visibility samples per pixel may match the number of shading samples per pixel. In other implementations, such as, for example, multi-sampling anti-aliasing solution (MSAA) applications, there may be a single shading sample per pixel and multiple visibility samples per pixel. In either case, the multiple samples may improve image or video quality, such as, for example, reducing jagged edge effects in images and crawling effects in video, or the like.

In general, using SSAA or MSAA or other graphics techniques may require a color buffer bandwidth increase or an increased bandwidth in other buffers. Such bandwidth increases may decrease system performance such as causing more cache line transactions, increasing memory usage, increasing power usage, or the like. Therefore, compression of graphics data may be advantageous

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 8 is a flow chart illustrating an example process;

DETAILED DESCRIPTION

Figure 1:
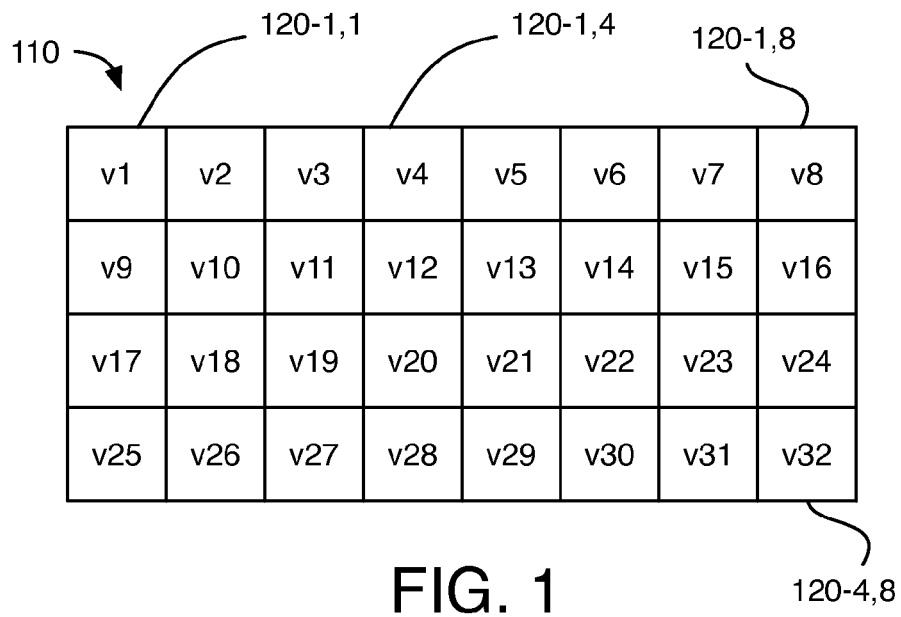
FIG. 1 is an illustrative diagram of an example tile of pixels having associated values.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to graphics rendering including techniques for compression and/or decompression of graphics data by use of indexed subsets.

As described above, it may be advantageous to compress (and decompress) graphics data such as rendered graphics data. As will be described in greater detail below, in some examples, graphics rendering and compression techniques may operate on tiles. In general, a tile may include any number of individual pixels, such as a rectangular region of W×H pixels, where W is the width of a tile and H is the height of a tile in pixels. For example, a tile may include an 8×4 pixel region having 32 pixels. In some examples, values, such as color values, may be determined for the individual pixels such that each pixel has a value. The values may be determined in any matter and may include any suitable information. For example, the values may include color values, low frequency shading color values, surface normal values, multi-sampling anti-aliasing color plane values, or the like. A subset of the values may be generated such that the subset includes the distinct values from the pixel values. For example, the subset may include one or more values (e.g., the subset may include one value if the values are the same for all pixels). The subset of values may be indexed such that an index values may be associated with each value in the subset. For each of the individual pixels, an associated pixel index value may be determined. For example, for the individual pixel value, the index value associated with the distinct value in the subset matching the individual pixel value may be assigned to the individual pixel. In such a manner, the individual pixels may be indexed to the subset of values.

Further, as is discussed in greater detail below, in general, the aim of the discussed compression techniques may be to achieve a bit budget. For example, memory bandwidth may be associated with a limit or a cache line or the like which may provide limits (e.g., 512 bits or the like) for memory transactions. If a compression technique may transmit or store data less than or equal to the limit, the number of transactions associated with the data may be reduced saving power and increasing performance. As discussed, a tile of individual pixels may be indexed and a subset of values (also indexed) may be generated. In general, if the pixel index values, the subset of indexed values, and the indexes of the subset are less than the desired bit budget, the compression may have succeeded. In such examples, graphics data comprising the subset of the values (i.e., the distinct values), the index values associated with the subset of the values, and the plurality of pixel index values may be stored in memory. In general, if the bit budget is not met, the compression may have failed and the individual pixel values may be stored uncompressed using standard techniques. As discussed, compressing pixel values of a tile of pixels may save significant bandwidth while transferring or storing graphics data in various computer implementations.

FIG. 1 is an illustrative diagram of an example tile 110 of pixels 120 having associated values v1-v32, arranged in accordance with at least some implementations of the present disclosure. As shown, tile 110 may include multiple pixels 120-1,1-120-4,8. In general, tile 110 may include any number of pixels. In some examples, tile 110 may be 8 pixels wide by 4 pixels high (and may therefore include 32 pixels, as shown). Also as shown, individual pixels 120-1,1-120-4,8 may have or include an associated value v1-v32. In general, values v1-v32 may include any suitable graphics data or rendering data, or the like. For example, values v1-v32 may include color values, low frequency shading color values, surface normal values, multi-sampling anti-aliasing color plane values, or the like. As described, in some examples, values v1-v32 may be color values such as low frequency pixel shading color values or multi-sampling anti-aliasing color plane values, or the like. In general, any number of values v1-v32 may be distinct. For example, if all of values v1-v32 are the same, there may be a single distinct value. If all of values v1-v32 are different, there may be 32 distinct values. In general, the compression techniques discussed herein below may be more effective if there are fewer distinct values. Such examples may be more likely to occur in various rendering contexts or using various techniques, such as, for example, when values v1-v32 are generated using lower frequency shading techniques when values v1-v32 are surface normal values, or the like.

As discussed, in some implementations, values v1-v32 may be generated using low frequency shading techniques. Using low frequency shading techniques, shading may be computed at a lower rate than once per pixel. For example, color values may be generated for every 1×2 pixels, every 2×1 pixels, every 2×2 pixels, every 4×2 pixels, every 2×4 pixels, every 4×4 pixels, or the like. In other examples, pixel shading may be split into two parts, such that one portion of the shading may be done per pixel (or per sample) and the other portion of the shading may be done at a slower rate, as described, and the results combined. In such examples, since color values are generated for regions larger than a per-pixel basis, a certain amount of duplication of values for tile 110 will occur. Further, in rendering real objects, it may be a frequent occurrence that a group of pixels may have the same color or that an entire tile of pixels may have the same color. Therefore, with low frequency pixel shading, the techniques discussed herein may be particularly advantageous, although the described techniques are not limited to such examples.

Figure 2:
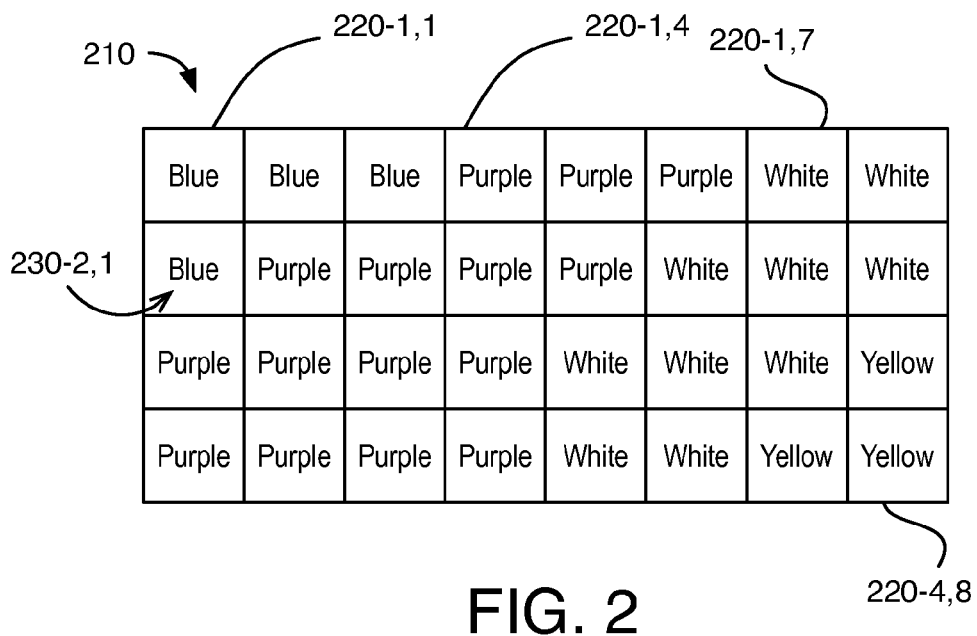
FIG. 2 is an illustrative diagram of an example tile of pixels having associated values.

FIG. 2 is an illustrative diagram of an example tile 210 of pixels 220 having associated values 230, arranged in accordance with at least some implementations of the present disclosure. As shown, in some examples, values 230 may include color values or low frequency pixel shading color values or the like. In the illustrated example, values 230 are shown using a description (i.e., "Blue", "Purple", "White" and "Yellow") for the sake of clarity of presentation. In general, color values may include red green blue alpha (RGBA) color values, a subset of RGBA values such as 8-bit red green blue alpha (R8G8B8A8) color values, pseudo luminance/intensity orange chrominance green chrominance alpha (YCoCgA) color values, or the like. Further, although described with respect to color values, in general, values 230 may include any graphics data or rendering values such as, for example, surface normal values or the like. In the example of FIG. 2, tile 210 may include four distinct values (i.e., "Blue", "Purple", "White" and "Yellow"). As will be appreciated, tile 210 may include from 1 to 32 distinct values. In general, values 320 may be determined using any suitable graphics processing technique or techniques. For example, values 230 may be generated by rendering tile 210. The rendering may include a rasterization technique such as applying a visibility function or applying a shading function or the like. In some examples, the rendering may include applying at least one of a super-sampling anti-aliasing technique, a multi-sampling anti-aliasing technique, a low frequency pixel shading technique, or the like.

Figure 3:
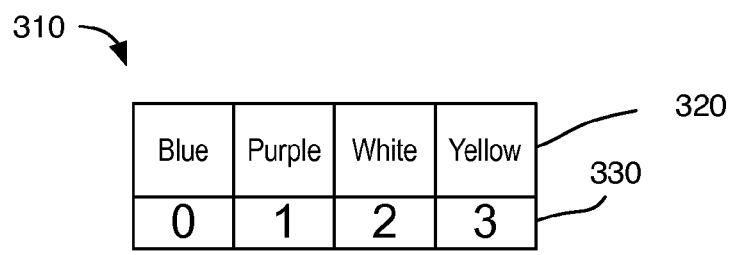
FIG. 3 is an illustrative diagram of an example indexed subset.

Turning now to FIG. 3, FIG. 3 is an illustrative diagram of an example indexed subset 310 including a subset of values 320 and associated index values 330, arranged in accordance with at least some implementations of the present disclosure. For example, indexed subset 310 may be generated by determining subset of values 320 such that subset of values 320 includes the distinct values of values 230 (as shown in FIG. 2) and associating index values 320 with each value of subset of values 320. As discussed, subset of values 320 may include any number of values according to the number of distinct values of values 230. Similarly, the number of index values 320 may match the number of values in the subset of values. In the example of FIG. 3, there are four values (i.e., "Blue", "Purple", "White" and "Yellow") in subset of values 320 and four index values 330 (i.e., "0", "1", "2" and "3"). In examples where subset of values 320 includes color values, the subset of values 320 may be described as a palette or a color palette or the like. In general, the number of values in subset of values 320 (and the number of index values) may include $2^k$ values (e.g., in the given example k=2) such that index values 330 may be k-bit index values. That is, to index $2^k$ values, an index value must have at least k bits. For example, to index two values, a single bit (i.e., k=1) may be used for index values 330. To index three or four values, two bits (i.e., k=2) may be needed. To index five to eight values, three bits (i.e., k=3) may be needed, and so on. If a single value is to be stored, no index bit may be required (since all values are the same). In the illustrated example, subset of values 320 includes four values and index values 330 are 2-bit values.

Figure 4:
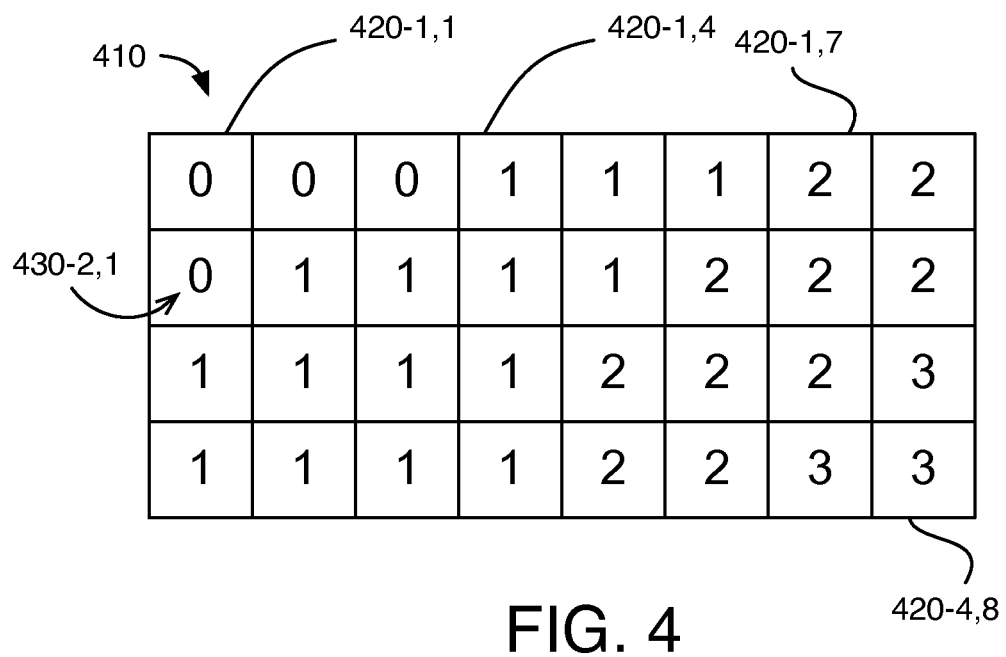
FIG. 4 is an illustrative diagram of an example tile of pixels having associated pixel index values.

Turning now to FIG. 4, FIG. 4 is an illustrative diagram of an example tile 410 of pixels 420 having associated pixel index values 430, arranged in accordance with at least some implementations of the present disclosure. For example, pixel index values 430 may be determined for each of individual pixels 420 such that values 230 (please refer to FIG. 2) may be indexed or replaced or the like with index values 430 such that index values 430 refer to, within indexed subset 310, subset of values 320 (please refer to FIG. 3). As will be appreciated, in transforming from values 230 to index values 430 and indexed subset 310, a compression without loss of information may have occurred. As discussed above, the number of bits of each of pixel index values 430 may depend on the number of values in subset of values 320. In the illustrated example, index values 430 may include 2-bits.

As discussed above, the aim of the discussed compression techniques may be to achieve a bit budget. For example, if tile 210 may use $2^n$ bits in an uncompressed format, a desired bit budget, B, may be $B=2^{n-1}$ bits. In other examples, the desired bit budget, B, may be $B=2^{n-2}$ bits, $B=3*B^{n-2}$ bits, or the like. In other examples, the bit budget may be associated with a system design rule or constraint or the like. For example, memory bandwidth may be associated with a limit or a cache line size or the like which may provide limits (e.g., 512 bits or the like) for memory transactions. Further, in some examples, more than one bit budgets may be available such that, the aim or goal may be to meet the lowest of the available bit budgets. In any event, if a compression technique may transmit or store data less than the bit budget or limit, the number of transactions associated with the data may be reduced saving power and increasing performance.

In the described examples, the maximum number of bits needed to store indexed subset 310 (including subset of values 320 and index values 330) and pixel index values 430 may be given as follows: W*H*k+C*P (where W may be the width of tile 410, H may be the height of tile 410, C may be the number of values in the subset of values 320, and P may be the number of individual colors in the tile, where $2^{k-1}<P<=2^k$ and may be the number of bits for index values 330 and/or pixel index values 430). If the number of bits is less than or equal to the desired bit budget (i.e., if W*H*k+ C*P<=B) then the graphics data (e.g., indexed subset 310 and pixel index values 430) may be stored in compressed form. In general, if the number of bits is less than or equal to the desired bit budget, the number of bits may be described as "less" than the desired bit budget or the bit budget may be described as met. If the number of bits is greater than the desired bit budget, then the graphics data may be stored in uncompressed form such that values 230 (please refer to FIG. 2) may be stored in memory directly using standard techniques. In examples where the number of bits is less (or equal to) than the desired bit budget, the compression may have been considered to succeed and in examples where the number of bits is greater than the desired bit budget, the compression may have been considered to fail.

In some examples, the compressed graphics data (i.e., indexed subset 310 and pixel index values 430) or portions thereof may be further compressed prior to storage. In some examples, the compression may be in response to the compressed graphics data failing a bit budget. In some examples, subset of values 320 may be compressed, prior to storing the graphics data. In other examples, pixel index values 430 may be compressed prior to storing the graphics data. In some examples, compressing pixel index values 430 may a delta-encoding or the like.

Figure 5:
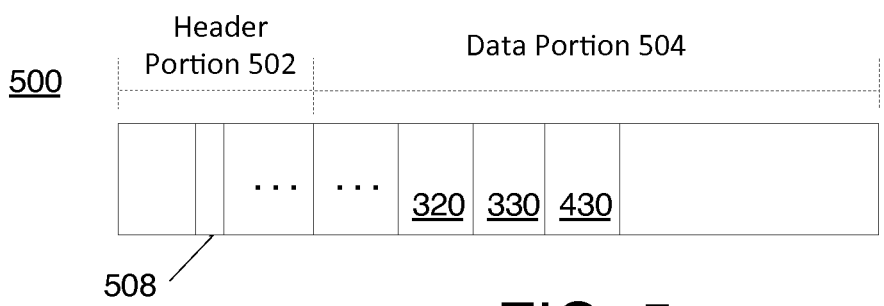
FIG. 5 is an illustrative diagram of example compressed graphics data.

Turning now to FIG. 5, FIG. 5 is an illustrative diagram of example compressed graphics data 500, arranged in accordance with at least some implementations of the present disclosure. As shown in FIG. 5, graphics data 500 may include a header portion 502 and/or a data portion 504. Also as shown, header portion 502 may include one or more indicators 508. For example, indicator 508 may include a flag or the like indicating whether data portion 504 is compressed according to the techniques described herein. Header portion 502 may include other indicators such as an indicator indicating whether subset of values 320 are compressed, an indicator indicating whether index values 330 are compressed, an indicator indicating whether pixel index values 430 are compressed, or the like. As shown, data portion 504 may include subset of values 320, index values 330, and/or pixel index values 430. Data portion 504 or header portion 502 may also include value k (i.e., the number of bits in the index values, as discussed above). As is described further herein, graphics data 500 may be stored in memory or retrieved from memory and decompressed. The header portion 502, and the data portion 504 may, in some implementations, be stored in separate physical memory areas and be backed by different caching mechanisms.

As will be discussed in greater detail below, a system, such as a computer-implemented system may be used to perform some or all of the various operations discussed herein in connection with FIGS. 1-5.

Figure 6:
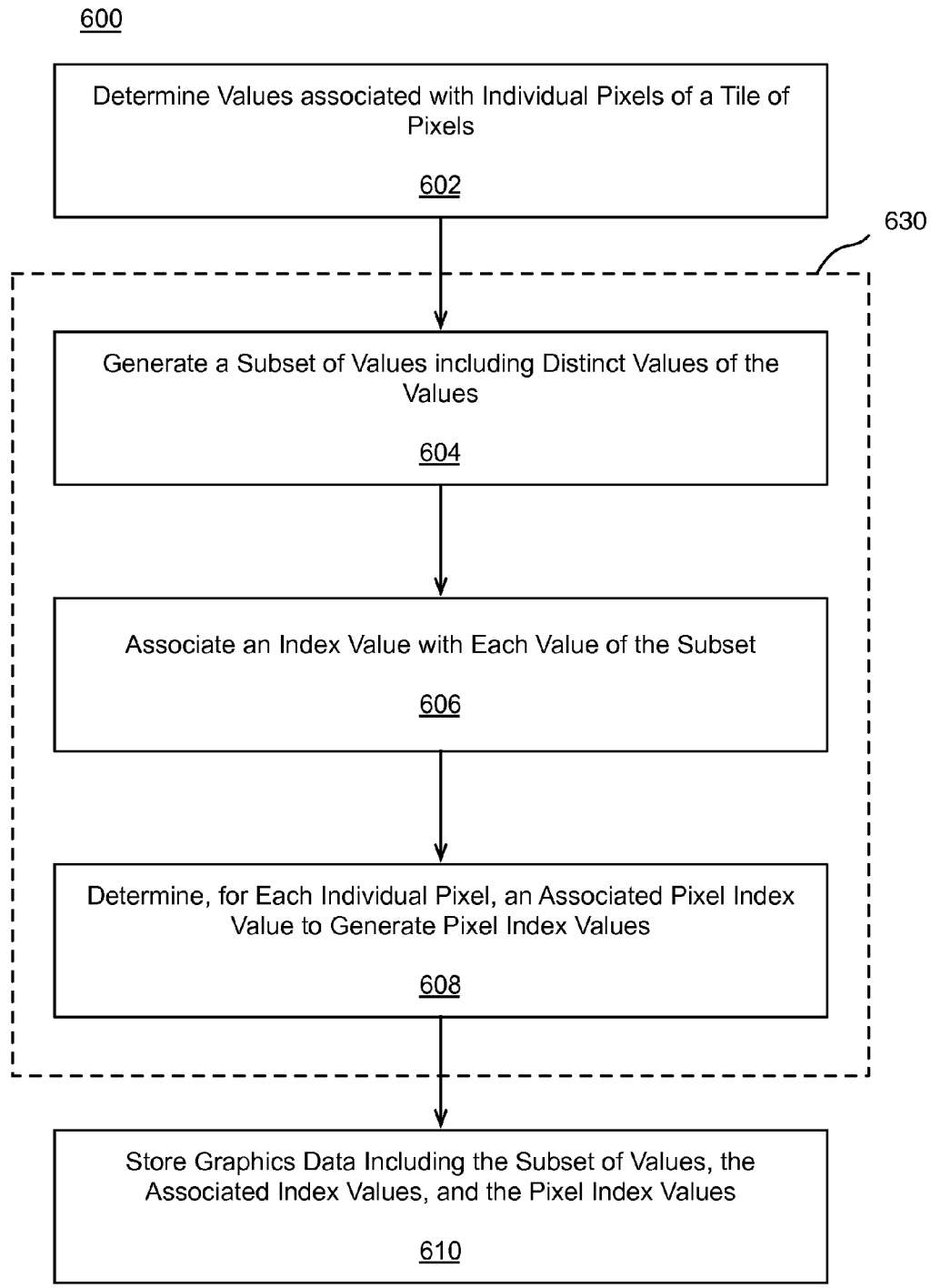
FIG. 6 is a flow chart illustrating an example process.

FIG. 6 is a flow chart illustrating an example process 600, arranged in accordance with at least some implementations of the present disclosure. In general, process 600 may provide a computer-implemented method for providing compression in graphics rendering. In the illustrated implementation, process 600 may include one or more operations, functions or actions as illustrated by one or more of blocks 602, 604, 606, 608 and/or 610. By way of non-limiting example, process 600 will be described herein with reference to operations discussed with respect to FIGS. 1-5 above and example system 100 discussed below.

Process 600 may be utilized as a computer-implemented method for providing compression in graphics rendering. Process 600 may begin at block 602, "Determine Values associated with Individual Pixels of a Tile of Pixels", where a plurality of values associated with individual pixels of a tile of pixels may be determined. For example, values v1-v32 of tile 110 or values 230 of tile 210 may be determined. In general, the values may be determined by any suitable technique such as, for example, various rendering techniques. In some examples, the rendering may include applying at least one of a super-sampling anti-aliasing technique, a multi-sampling anti-aliasing technique, or a low frequency pixel shading technique. In other examples, determining the plurality of values may include accessing graphics data (e.g., via a cache or buffer or the like) associated with the tile of pixels. For example, the first graphics data may include the plurality of values. Such accessing of graphics data may occur on a cache evict for example.

Processing may continue from operation 602 to operation 604, "Generate a Subset of Values including Distinct Values of the Values", where a subset of the plurality of values including one or more distinct values from the plurality of values may be determined. For example, subset of values 320 may be determined based on values 230 as discussed herein.

Processing may continue from operation 604 to operation 606, "Associate an Index Value with Each Value of the Subset", where an index value may be associated with each value of the subset of the plurality of values. For example, index values 330 may be associated with subset of values 320 to generate indexed subset 310.

Processing may continue from operation 606 to operation 608, "Determine, for Each Individual Pixel, an Associated Pixel Index Value to Generate Pixel Index Values", where, for each of the individual pixels, an associated pixel index value may be determined to generate a plurality of pixel index values associated with the individual pixels of the tile of pixels. For example, pixel index values 430 may be generated for each of individual pixels 420.

Processing may continue from operation 608 to operation 610, "Store Graphics Data Including the Subset of Values, the Associated Index Values, and the Pixel Index Values", where graphics data comprising the subset of the plurality of values, the associated index values, and the plurality of pixel index values may be stored. For example, the graphics data may be stored in a memory. For example, subset of values 320, index values 330, and pixel index values 430 may be stored. In some examples the graphics data may include graphics data 500. As discussed, in some examples, the graphics data may be stored in compressed format only if it meets a bit budget. In such examples, the number of bits for the graphics data associated with the subset of the plurality of values, the associated index values, and the plurality of pixel index values may be compared with the bit budget. If the number of bits for the graphics data associated with the subset of the plurality of values, the associated index values, and the plurality of pixel index values is less than the bit budget, the graphics data associated with the subset of the plurality of values, the associated index values, and the plurality of pixel index values may be stored. If the number of bits for the graphics data associated with the subset of the plurality of values, the associated index values, and the plurality of pixel index values is greater than the bit budget, other graphics data including the plurality of values associated with individual pixels of a tile of pixels may be stored.

As shown in FIG. 6, in some examples, blocks 604, 606, and 608 may be performed serially. However, as discussed herein, in general, the blocks of FIG. 6 may be performed in any order and some blocks may be skipped entirely. In some examples, grouping 630 of blocks 604, 606, and 608 may be performed in parallel or substantially in parallel.

Figure 7:
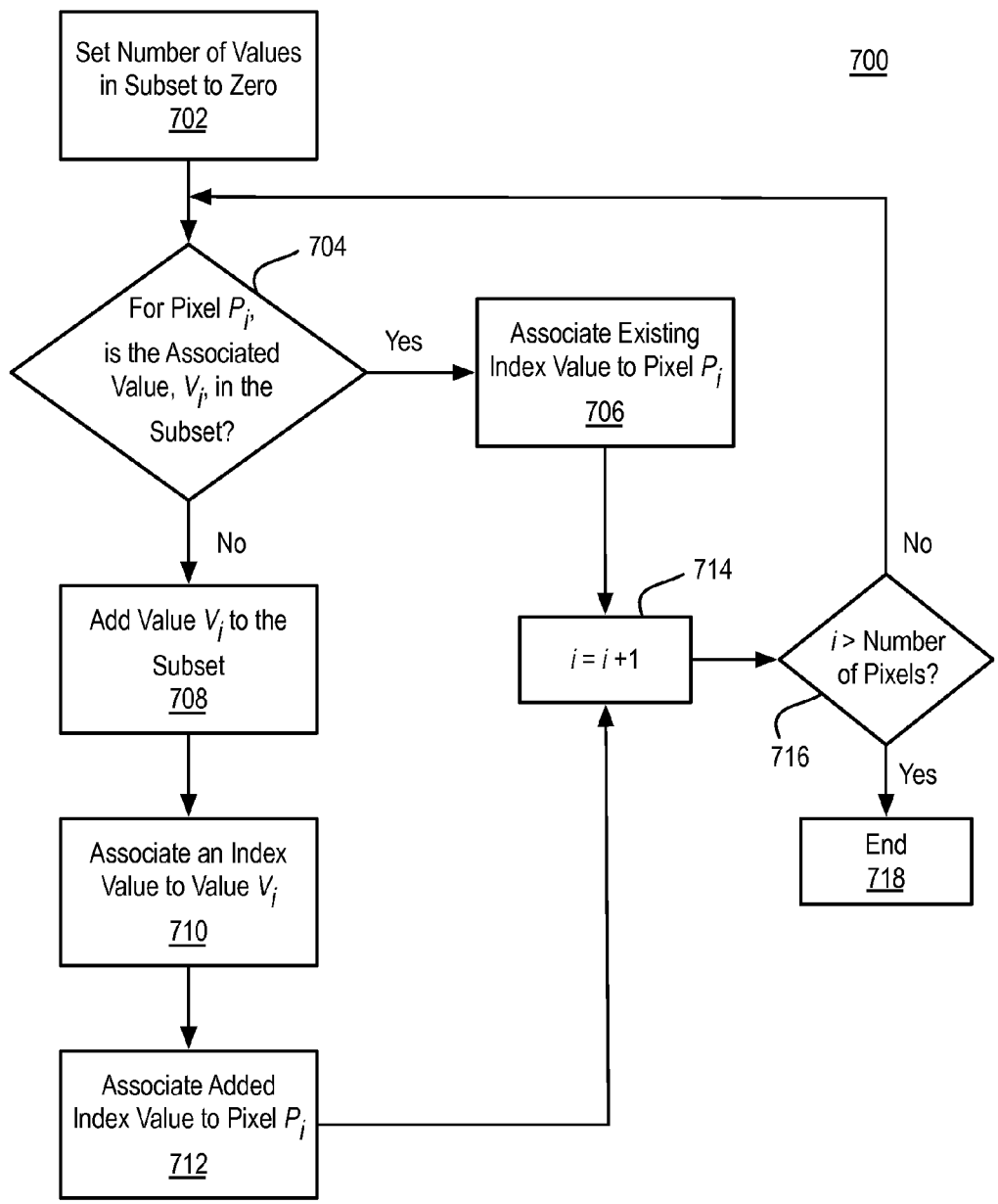
FIG. 7 is a flow chart illustrating an example process.

For example, FIG. 7 is a flow chart illustrating an example process 700, arranged in accordance with at least some implementations of the present disclosure. In various examples, process 700 may perform the operations of grouping 630. In general, process 700 may provide a computer-implemented method for providing compression in graphics rendering. In the illustrated implementation, process 700 may include one or more operations, functions or actions as illustrated by one or more of blocks 702, 704, 706, 708, 710, 712, 714, 716, and/or 718. By way of non-limiting example, process 700 will be described herein with reference to operations discussed with respect to FIGS. 1-6 above and example system 100 discussed below.

Process 700 may be utilized as a computer-implemented method for providing compression in graphics rendering. Process 700 may begin at block 702, "Set Number of Values in Subset to Zero", where the number of values in a subset of values may be set to zero. For example, the number of values in subset of values 320 (and the number of index values 330) may be set to zero. For example, the subset of values may be cleared.

Processing may continue from operation 702 to operation 704, "For Pixel $P_i$, is the Associated Value, $V_i$, in the Subset?", where it may be determined for a current pixel whether the value associated with the current pixel value is in the subset. For example, at the first instance of operation 704, counter value i may be set to one. For pixel one, it may be determined whether the value associated with pixel one is in the subset. As will be appreciated, in some examples, at the first instance of operation 704, the operation may be substantially skipped since the subset may have been cleared. At subsequent iterations of operation 704, the value associated with a current pixel may be compared to each value in the subset to determine whether the associated value is in the subset. For example, for pixel 220-2,1 (please refer to FIG. 2), a value 230-2,1 of "Blue" may already be stored in indexed subset 310 (assuming for the sake of this example that the pixels are ordered from left-to-right and top-to-bottom). The value of "Blue" may have been stored in association with pixel 220-1,1, for example.

In such examples, process 700 may continue at operation 706, "Associate Existing Index Value to Pixel $P_i$", where the index value associated with the value may be associated with the current pixel. For example, for pixel 420-2,1 (please refer to FIG. 4), an index value 430-2,1 of "0" may be associated with pixel 420-2,1.

In other examples of subsequent iterations of operation 704, the value associated with the current pixel may not be in the subset. For example, for pixel 220-1,7 (please refer to FIG. 2), a value of "White" may not yet be stored in indexed subset (assuming again for the sake of this example that the pixels are ordered from left-to-right and top-to-bottom).

In such examples, process 700 may continue at operation 708, "Add Value $V_i$ to the Subset", where the value may be added to the subset. Continuing the above example, a value of "White" (e.g., for pixel 220-1,7) may be stored in subset of values 320.

Process 700 may continue from operation 708 to operation 710, "Associate an Index Value to Value $V_i$" where an index value may be associated with the added value. Continuing the above example, an index value "2" in index values 330 may be associated with value "White" of subset of values 320.

Process 700 may continue from operation 710 to operation 712, "Associate Added Index Value to Pixel $P_i$", where the index value associated with the added value may be associated with the current pixel. Continuing the above example, for pixel 420-1,7 (please refer to FIG. 4), a pixel index value of "2" may be associated with pixel 420-1,7.

Process 700 may continue from operation 712 or operation 706 (as discussed above) to operation 714, "i=i+1", where counter variable i may be increased by one. For example, increasing i by one may move from one pixel to the next for process 700.

Process 700 may continue from operation 714 to operation 716, "i>Number of Pixels?", where it may be determined whether i is greater than the number of pixels. That is, if i is greater than the number of pixels, the previous iteration may have been for the last pixel, and process 700 may end at operation 718, "End". If i is not greater than the number of pixels, process 700 may continue at operation 704 for another iteration as described above.

In general, process 600 and/or 700 may provide for compression in graphics rendering as discussed herein. Process 600 and/or process 700 may be repeated any number of times either in serial or in parallel, as needed. Furthermore, in general, process 600 and/or process 700 may be implemented via hardware, software, firmware, or a combination thereof, as is discussed further herein.

FIG. 8 is a flow chart illustrating an example process 800, arranged in accordance with at least some implementations of the present disclosure. In general, process 800 may provide a computer-implemented method for providing decompression in graphics rendering. In the illustrated implementation, process 800 may include one or more operations, functions or actions as illustrated by one or more of blocks 802, 804, 806, 808, and/or 810. By way of non-limiting example, process 800 will be described herein with reference to operations discussed with respect to FIGS. 1-5 above and example system 100 discussed below.

Process 800 may be utilized as a computer-implemented method for providing decompression in graphics rendering. Process 800 may begin at block 802, "Access Graphics Data" where graphics data may be accessed. For example, the graphics data may include a subset of a plurality of values, associated index values, and a plurality of pixel index values. For example, the graphics data may be accessed via memory and may include subset of values 320, index values 330, and pixel index values 430, as discussed herein. In some examples the graphics data may include graphics data 500.

Processing may continue from operation 802 to operation 804, "Determine a Subset of Values" where a subset of a plurality of values may be determined. For example, subset of values 320 may be determined. In general, the subset of the plurality of values may be determined using any suitable technique or techniques. In some examples, the subset of values may be read from a memory such as a cache memory or graphics buffer or the like. As discussed, in various examples, the subset of a plurality of values may be stored in a compressed form or in an uncompressed form in memory as a part of graphics data such as graphics data 500. In some examples, determining the subset of the plurality of values may include reading a portion of the graphics data from memory. In other examples, determining the subset of the plurality of values may include reading and decompressing a portion of the graphics data.

Processing may continue from operation 804 to operation 806, "Determine Index Values associated with the Subset of Values" where index values associated with each value of the subset of the plurality of values may be determined. For example, index values 330 may be determined. In general, the index values may be determined using any suitable technique or techniques. In some examples, the index values may be read from memory as part of graphics data such as graphics data 500.

Processing may continue from operation 806 to operation 808, "Determine Pixel Index Values based on The Graphics Data" where a plurality of pixel index values may be determined. For example, pixel index values 430 may be determined. In general, the pixel index values may be determined using any suitable technique or techniques. In some examples, the pixel index values may be read from a memory such as a cache memory or graphics buffer or the like. As discussed, in various examples, the pixel index values may be stored in a compressed form or in an uncompressed form in memory as a part of graphics data such as graphics data 500. In some examples, determining the pixel index values may include reading a portion of the graphics data from memory. In other examples, determining the pixel index values may include reading and decompressing a portion of the graphics data based at least in part on the graphics data.

Processing may continue from operation 808 to operation 810, "Determine Pixel Values for Individual Pixels of a Tile of Pixels based on Subset Values and the Pixel Index Values" where a plurality of values associated with individual pixels of a tile of pixels may be determined based at least in part on the subset of the plurality of values, the index values associated with each value of the subset of the plurality of values, and the plurality of pixel index values. For example, values 230 of tile 210 of pixels 220 may be determined based on subset of values 320, index values 330, and pixel index values 430 (please refer to FIGS. 2-4).

In general, process 800 may provide for decompression in graphics rendering as discussed herein. Process 800 may be repeated any number of times either in serial or in parallel, as needed. Furthermore, in general, process 800 may be implemented via hardware, software, firmware, or a combination thereof, as is discussed further herein.

Some additional and/or alternative details related to process 600, 700 or 800 may be illustrated in one or more examples of implementations discussed in greater detail below with regard to FIG. 9.

Figure 9:
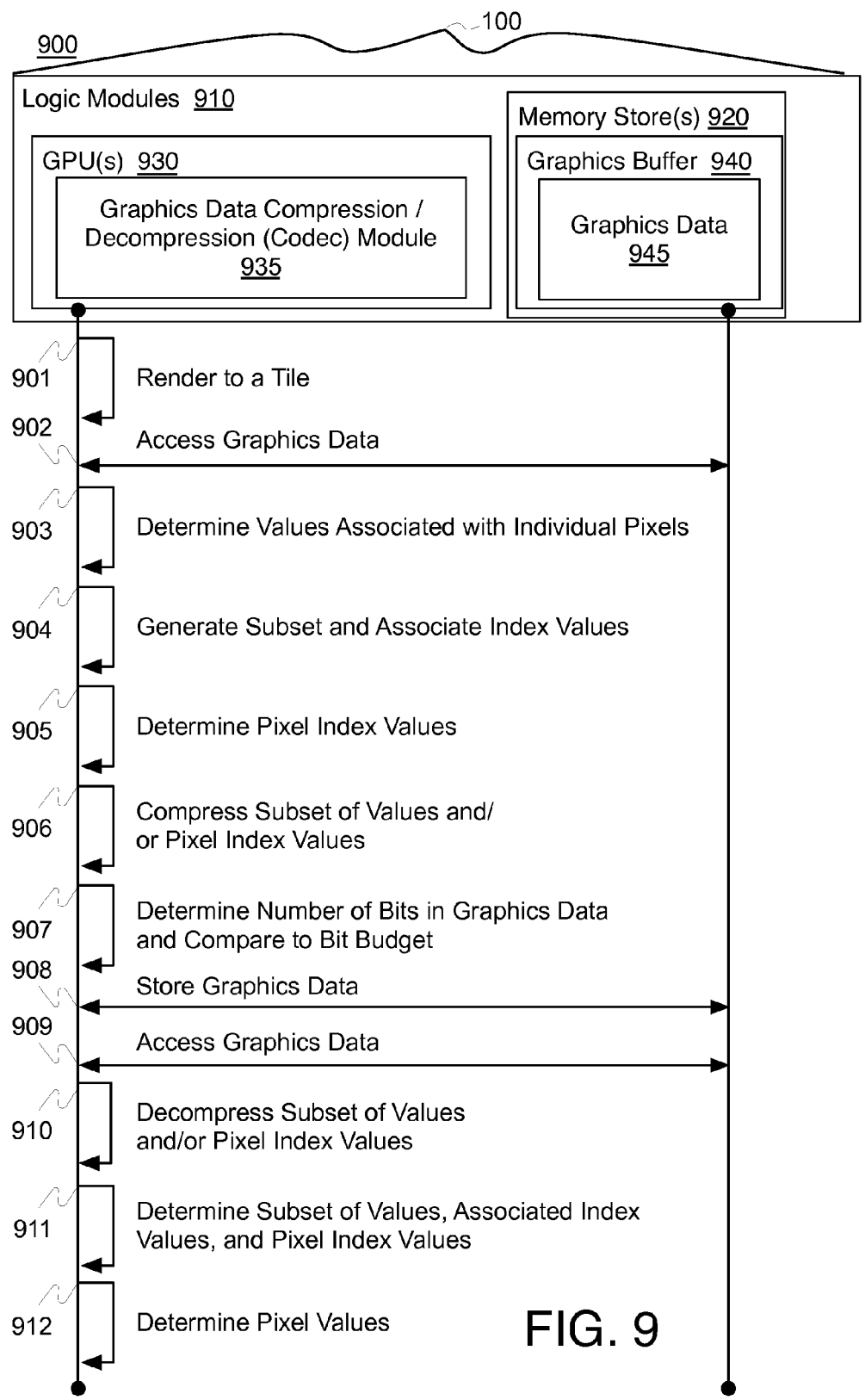
FIG. 9 is an illustrative diagram of example system and process for providing compression and/or decompression in graphics rendering.

FIG. 9 is an illustrative diagram of example system 100 and process 900 for providing compression and/or decompression in graphics rendering, arranged in accordance with at least some implementations of the present disclosure. In the illustrated implementation, process 900 may include one or more operations, functions or actions as illustrated by one or more of actions 901, 902, 903, 904, 905, 906, 907, 908, 909, and/or 910. By way of non-limiting example, process 900 also will be described herein with reference to example video coding system 100 of FIG. 10, as is described herein below.

In the illustrated implementation, system 100 may include logic modules 910, the like, and/or combinations thereof. For example, modules 910, may include memory store(s) 920, graphics processing unit(s) 930, which may include graphics data compression/decompression ("codec") module 935, and graphics buffer 940, the like, and/or combinations thereof. In various examples, graphics data codec module 935 may provide compression or decompression or both.

Graphics data codec module 935, for example, may be configured to determine a plurality of values associated with individual pixels of a tile of pixels, generate a subset of the plurality of values such that the subset of the plurality of values includes one or more distinct values from the plurality of values, associate an index value with each value of the subset of the plurality of values, determine, for each of the individual pixels, an associated pixel index value to generate a plurality of pixel index values associated with the individual pixels of the tile of pixels, and/or store, in the graphics buffer, graphics data including the subset of the plurality of values, the associated index values, and the plurality of pixel index values. In such a manner, graphics data codec module 935 may provide compression for graphics data such as values associated with pixels of a tile of pixels, for example.

Graphics data codec module 935 (or another module of graphics processing unit(s) 930) may be further configured to access graphics data including a subset of a plurality of values, associated index values, and a plurality of pixel index values, as discussed herein, determine a subset of a plurality of values based on the graphics data, determine index values associated with each value of the subset of the plurality of values, determine a plurality of pixel index values based at least in part on the graphics data, and determine a plurality of values associated with individual pixels of a tile of pixels based on the subset of the plurality of values, the index values associated with each value of the subset of the plurality of values, and the plurality of pixel index values. In such a manner, graphics data codec module 935 (or another module of graphics processing unit(s) 930) may provide decompression for graphics data such as values associated with pixels of a tile of pixels, for example. As discussed, in some examples, graphics data codec module 935 may be configured to provide both compression and decompression. In other examples, compression and decompression may be provided by separate modules (e.g., compression module(s) and decompression module(s)).

Process 900 may be utilized as a computer-implemented method for providing compression and/or decompression in graphics rendering. Process 900 may begin at block 901, "Render to a Tile", where a tile of pixels may be rendered. The tile may be rendered using any suitable techniques and may generate a tile of pixels as discussed herein. The rendering may be based on any suitable data such as image data, model, models, or model data, scene data, vector data, raster data, or the like.

Processing may continue from operation 901 to operation 902, "Access Graphics Data", where graphics data codec module 935 may access graphics data via graphics buffer 940 of memory stores 920. The graphics data may contain any data as discussed herein (either compressed or uncompressed). In some examples, the graphics data may include pixel values such as, for example, pixel values 230.

Processing may continue from operation 902 to operation 903, "Determine Values Associated with Individual Pixels", where a plurality of values associated with individual pixels of a tile of pixels may be determined. For example, values v1-v32 of tile 110 or values 230 of tile 210 may be determined As shown, in some examples, determining the plurality of values may include accessing graphics data 945 via graphics buffer 940. For example, graphics data 945 may include the plurality of values. Such accessing of graphics data may occur on a cache evict for example.

Processing may continue from operation 903 to operation 904, "Generate Subset and Associate Index Values", where a subset of the plurality of values including one or more distinct values from the plurality of values may be determined. For example, subset of values 320 may be determined based on values 230 as discussed herein.

Processing may continue from operation 904 to operation 905, "Determine Pixel Index Values", where for each of the individual pixels, an associated pixel index value may be determined to generate a plurality of pixel index values associated with the individual pixels of the tile of pixels. For example, pixel index values 430 may be generated for each of individual pixels 420.

Processing may continue from operation 905 to operation 906, "Compress Subset of Values and/or Pixel Index Values", where prior to storing the graphics data, at least one of the subset of plurality of values or the plurality of pixel index values may be compressed.

For example, the subset of the plurality of values may be compressed prior to storage in memory. As discussed, in some examples, the values may include color values. In such examples, the color values may be compressed as follows. As discussed, a color palette may include, at most, $2^k$ colors such as, for example a total number of colors given as P. In general, the P colors may be compressed prior to storage using any color compression scheme. For example, the minimum value of each color component may be determined and a color component may store the residual between the actual color component value and the minimum color component value. Such compression may provide bits that indicate how many bits are needed for the residuals for each color component. In some examples, 3 bits may be provided for red residuals, 2 bits may be provided for green residuals, and so on.

Further, the pixel index values may be compressed. In some implementations, many of the pixel index values may be the same. In general, any compression technique or techniques maybe used to compress the pixel index values. For example, the pixel index values may be put in a list and a run-length encoding may be applied to the list. In other examples, if pixel index values in a 2×2 pixel region (or the like) are the same, a single index may be stored for the 2×2 region.

Processing may continue from operation 906 to operation 907, "Determine Number of Bits in Graphics Data and Compare to Bit Budget", where a number of bits for the graphics data associated with the subset of the plurality of values, the associated index values, and the plurality of pixel index values may be determined and a bit budget may be determined. For example, the number of bits may be determined by adding bit contributions from the subset of the plurality of values, the associated index values, and the plurality of pixel index values, as discussed herein.

Processing may continue from operation 907 to operation 908, "Store Graphics Data", where graphics data comprising the subset of the plurality of values, the associated index values, and the plurality of pixel index values may be stored. For example, the graphics data may be stored in a memory. For example, subset of values 320, index values 330, and pixel index values 430 may be stored. In some examples the graphics data may include graphics data 500.

In general, operations 901-908 may provide graphics data compression. Such compression may occur when storing graphics data into graphics buffer 940, on a cache evict of graphics buffer 940, or the like.

As follows, operations 909-912 may provide graphics data decompression. For example, processing may continue from operation 908 to operation 909, "Access Graphics Data", where graphics data may be accessed. For example, the graphics data may include a subset of a plurality of values, associated index values, and a plurality of pixel index values. For example, the graphics data may be accessed via memory and may include subset of values 320, index values 330, and pixel index values 430, as discussed herein. In some examples the graphics data may include graphics data 500.

Processing may continue from operation 909 to operation 910, "Decompress Subset of Values and/or Pixel Index Values", where the subset of values or the pixel index values or both may be decompressed. For example, the graphics data may include a portion of data for the subset of values, which may be decompressed to generate subset of values 320 and/or another portion of data for the pixel index values, which may be decompressed to generate pixel index values 430. In general, operation 910 may be skipped in implementations where neither the subset of values nor the pixel index values are compressed. In such implementations, processing may continue from operation 909 to 911.

In either case, processing may continue at operation 911, "Determine Subset of Values, Associated Index Values, and Pixel Index Values", where a subset of a plurality of values, index values associated with each value of the subset of the plurality of values, and a plurality of pixel index values may be determined. For example, subset of values 320 may be determined. In general, the subset of the plurality of values may be determined using any suitable technique or techniques. As discussed, in various examples, the subset of a plurality of values may be stored in a compressed form or in an uncompressed form in memory as a part of graphics data such as graphics data 500. In some examples, determining the subset of the plurality of values may include reading a portion of the graphics data from graphics buffer 940. In other examples, determining the subset of the plurality of values may include reading and decompressing a portion of the graphics data. Similarly, index values 330 may be determined. In some examples, the index values may be read from graphics buffer 940 as part of graphics data 945. Similarly, a plurality of pixel index values may be determined. As discussed, in various examples, the pixel index values may be stored in a compressed form or in an uncompressed form. In some examples, determining the pixel index values may include reading a portion of graphics data 945 from graphics buffer 940. In other examples, determining the pixel index values may include reading and decompressing a portion of the graphics data 945.

Processing may continue from operation 911 to operation 912, "Determine Pixel Values", where a plurality of values associated with individual pixels of a tile of pixels may be determined based at least in part on the subset of the plurality of values, the index values associated with each value of the subset of the plurality of values, and the plurality of pixel index values. For example, values 230 of tile 210 of pixels 220 may be determined based on subset of values 320, index values 330, and pixel index values 430 (please refer to FIGS. 2-4).

In general, operations 909-912 may provide graphics data decompression. Such decompression may occur when using or preparing to use graphics data 945. For example, such decompressed graphics data may be used for rendering a tile, displaying an image, or the like.

In general, process 900 may be repeated any number of times either in serial or in parallel, as needed. Furthermore, in general, graphics data codec module 935 may be implemented via hardware, software, and/or firmware. As shown, in some implementations, graphics data codec module 935 may be implemented via graphics processing unit(s) 930. In other implementations, graphics data codec module 935 may be implemented via software implemented via one or more central processing unit(s). In general, graphics data codec module 935 and/or the operations discussed herein may be enabled or enabled at a system or user level, for example.

While implementation of example processes 600, 700, 800, 900 and other processes discussed herein may include the undertaking of all blocks shown in the order illustrated, the present disclosure is not limited in this regard and, in various examples, implementation of the processes discussed herein may include the undertaking only a subset of the blocks shown and/or in a different order than illustrated.

In addition, any one or more of the blocks or operations discussed herein (such as the operations illustrated and discussed with respect to FIGS. 1-9) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
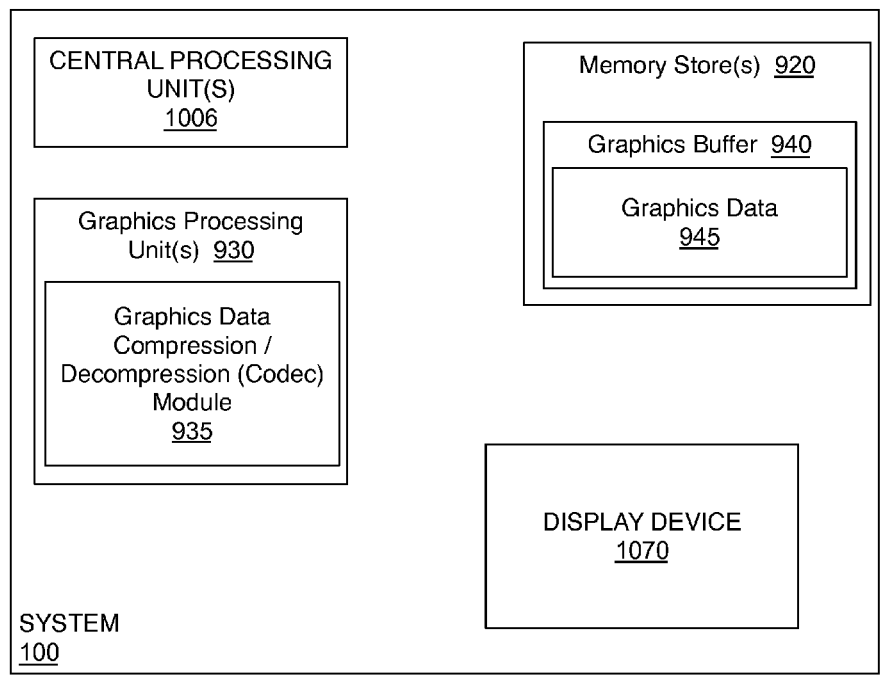
FIG. 10 is an illustrative diagram of an example system for compression and/or decompression providing graphics rendering.

FIG. 10 is an illustrative diagram of an example system 100 for providing compression is graphics rendering, arranged in accordance with at least some implementations of the present disclosure. In the illustrated implementation, system 100 may include one or more central processing units 1006, one or more memory stores 920, one or more graphics processing units 930, graphics buffer 940 and/or a display device 1070. Central processing units 1006, memory store 920, graphics processing units 930, buffer 940, and/or display device 1070 may be capable of communication with one another, via, for example, a bus or other access. In various implementations, display device 1070 may be integrated in system 100 or implemented separately from system 100.

As shown in FIG. 10, and discussed above, graphics data codec module 935 may be implemented via graphics processing units 930. In other example, graphics data codec module 935 may be implemented via central processing units 1006. As shown, graphics processing unit 930 may include graphics data codec module 935. Graphics processing unit 930 may be communicatively coupled to graphics buffer 940. Graphics data codec module 935 may be configured to determine a plurality of values associated with individual pixels of a tile of pixels, generate a subset of the plurality of values such that the subset of the plurality of values comprises one or more distinct values from the plurality of values, associate an index value with each value of the subset of the plurality of values, determine, for each of the individual pixels, an associated pixel index value to generate a plurality of pixel index values associated with the individual pixels of the tile of pixels, and store, in the graphics buffer, graphics data including the subset of the plurality of values, the associated index values, and the plurality of pixel index values, and/or provide other operations as discussed herein. In general, memory stores 920 may be communicatively coupled to graphics processing unit 930. Memory stores 920 may include graphics buffer 940, which may be accessed by graphics data codec module 935 to retrieve graphics data 945. Furthermore, display device 1070 may be configured to display output image data (not shown) based at least in part on graphics data 945. As discussed, graphics data codec module 935 may be further configured to access and/or decompress graphics data 945 as discussed herein.

As will be appreciated, the modules illustrated in FIG. 10 may include a variety of software and/or hardware modules and/or modules that may be implemented via software and/or hardware. For example, the modules may be implemented as software via central processing units 1006 and/or graphics processing units 930 or the modules may be implemented via a dedicated hardware portion or portions of graphics processing units 930. Furthermore, the shown memory stores 920 may be shared memory for central processing units 906 and/or graphics processing units 920, for example. Furthermore, graphics buffer 940 may be implemented via memory stores 920 or separately from memory stores 920 and/or graphics buffer 940 may be implemented via a general buffer that may include other buffer portions such as a render buffer, or the like. Also, system 100 may be implemented in a variety of ways. For example, system 100 (excluding display device 1070) may be implemented as a single chip or device having a graphics processor, a quad-core central processing unit, on-board cache, and a memory controller input/output (I/O) module (not shown). In other examples, system 100 (again excluding display device 1070) may be implemented as a chipset.

Central processing units 1006 may include any suitable implementation including, for example, microprocessor(s), multicore processors, application specific integrated circuits, chip(s), chipsets, or the like. Furthermore, graphics processing units 930 may include any suitable implementation including, for example, processor(s), multicore processors, application specific integrated circuits, programmable logic devices, graphics cards, integrated graphics, general purpose graphics processing unit(s), or the like. In addition, memory stores 920 and/or graphics buffer 940 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 920 and/or graphics buffer 940 may be implemented via cache memory. In various examples, system 100 may be implemented as a chipset or as a system on a chip.

Figure 11:
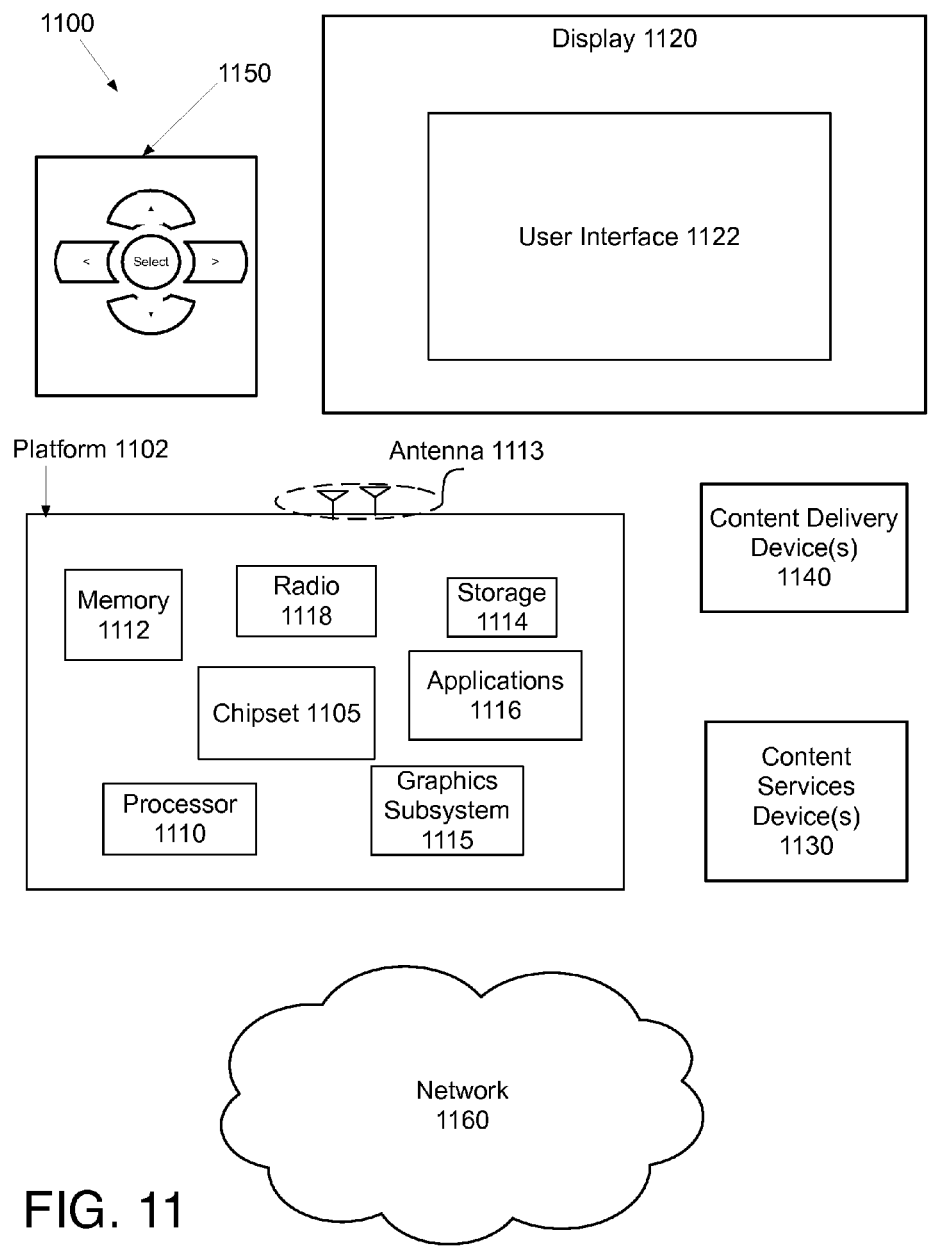
FIG. 11 is an illustrative diagram of an example system.

FIG. 11 illustrates an example system 1100 in accordance with the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 820 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
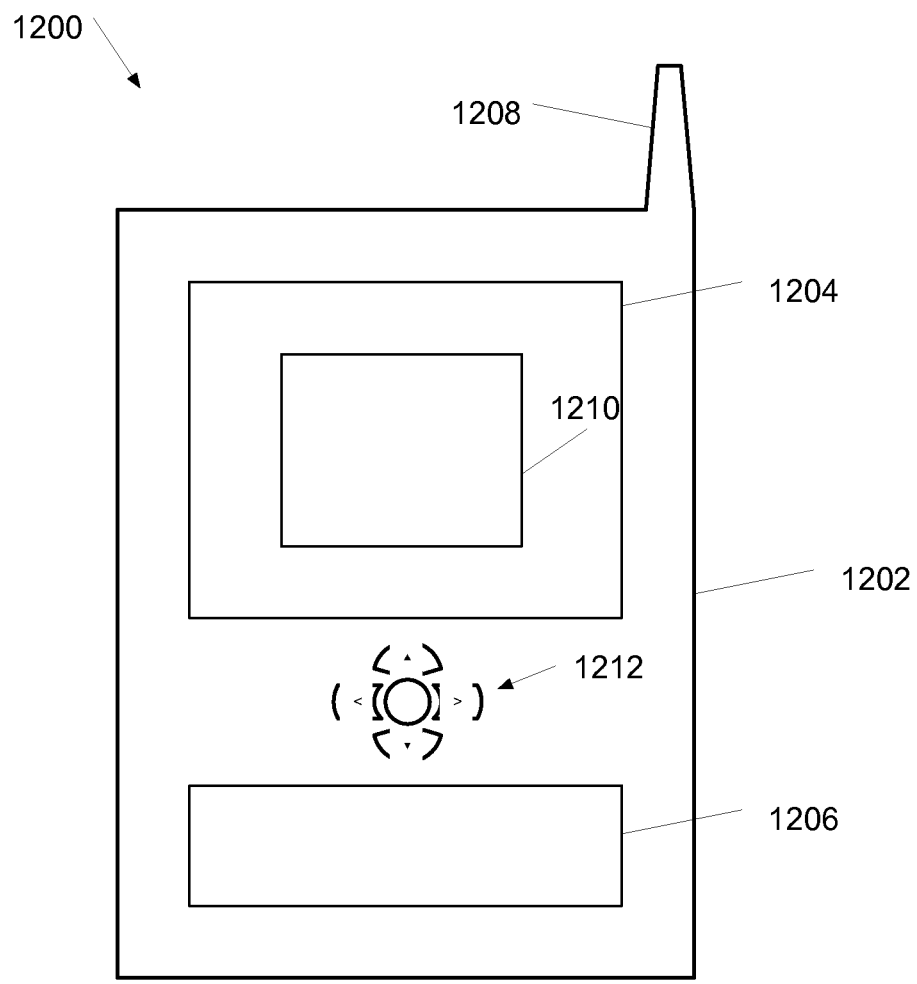
FIG. 12 illustrates an example device, all arranged in accordance with at least some implementations of the present disclosure.

As described above, system 1100 may be embodied in varying physical styles or form factors. FIG. 12 illustrates implementations of a small form factor device 1200 in which system 1100 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for providing compression in graphics rendering may include determining a plurality of color values associated with individual pixels of a tile of pixels, generating a subset of the plurality of color values such that the subset of the plurality of color values include one or more distinct color values from the plurality of color values, associating an index value with each color value of the subset of the plurality of color values, determining, for each of the individual pixels, an associated pixel index value to generate a plurality of pixel index values associated with the individual pixels of the tile of pixels, storing, in memory, graphics data including the subset of the plurality of color values, the associated index values, and the plurality of pixel index values.

In other examples of a computer-implemented method for providing compression in graphics rendering, the tile of pixels may be rendered. Rendering the tile of pixels may include rasterization including applying at least one of a visibility function or a shading function. Rendering the tile of pixels may include applying at least one of a super-sampling anti-aliasing technique, a multi-sampling anti-aliasing technique, or a low frequency pixel shading technique. Prior to storing the graphics data, at least one of the subset of the plurality of color values or the plurality of pixel index values may be compressed. Compressing the plurality of pixel index values may include a delta-encoding of the plurality of index values. A subset number value associated with the number of values in the subset may be stored in memory. A number of bits for the graphics data associated with the subset of the plurality of color values, the associated index values, and the plurality of pixel index values may be determined A bit budget may be determined. The number of bits for the graphics data associated with the subset of the plurality of color values, the associated index values, and the plurality of pixel index values may be compared with the bit budget. If the number of bits for the graphics data associated with the subset of the plurality of color values, the associated index values, and the plurality of pixel index values is less than or equal to the bit budget the graphics data associated with the subset of the plurality of color values, the associated index values, and the plurality of pixel index values may be stored in memory. If the number of bits for the graphics data associated with the subset of the plurality of color values, the associated index values, and the plurality of pixel index values is greater than the bit budget, second graphics data including the plurality of color values associated with the individual pixels of the tile of pixels may be stored in memory. The bit budget may be one of a plurality of available bit budgets. The subset number value and the graphics data may be accessed. The subset of the plurality of color values may be determined based on the graphics data such that determining the subset of the plurality of values may include at least one of reading a portion of the graphics data or decompressing the portion of the graphics data. The index values associated with each color value of the subset of the plurality of color values may be determined. The plurality of pixel index values may be determined based on the graphics data such that determining the plurality of pixel index values may include at least one of reading a second portion of the graphics data or decompressing the second portion of the graphics data. The plurality of color values associated with individual pixels of the tile of pixels may be determined based on the subset of the plurality of color values, the index values associated with each color value of the subset of the plurality of values, and the plurality of pixel index values. Determining the plurality of color values may include accessing first graphics data associated with the tile of pixels such that the first graphics data may include the plurality of color values, and such that accessing the first graphics data associated with the tile may include accessing the first graphics data associated with the tile upon a cache evict. Generating the subset of the plurality of color values, associating the index value with each value of the subset of the plurality of color values, and determining, for each of the individual pixels, the associated pixel index value may include setting a number of values in the subset of the plurality of values to zero and, for each pixel of the individual pixels, determining whether the color value associated with the current pixel value is in the subset. If the color value associated with the current pixel value is in the subset, the index value associated with the value may be associated with the current pixel. If the color value associated with the current pixel value is not in the subset, the value may be added to the subset, an index value may be associated with the added color value, and the index value associated with the added color value may be associated with the current pixel. The plurality of color values may include at least one of low frequency pixel shading color values or multi-sampling anti-aliasing color plane values. The tile of pixels may be 8 pixels wide by 4 pixels high.

In another example, a system for compression in graphics rendering on a computer may include a graphics buffer, a graphics processing unit, and a display device. The graphics processing unit may include a graphics codec module. The graphics processing unit may be communicatively coupled to the graphics buffer and the graphics codec module may be configured to determine a plurality of color values associated with individual pixels of a tile of pixels, generate a subset of the plurality of color values such that the subset of the plurality of color values comprises one or more distinct color values from the plurality of values, associate an index value with each color value of the subset of the plurality of color values, determine, for each of the individual pixels, an associated pixel index value to generate a plurality of pixel index values associated with the individual pixels of the tile of pixels, and store, in the graphics buffer, graphics data including the subset of the plurality of color values, the associated index values, and the plurality of pixel index values. The display device may be configured to display output image data based at least in part on the graphics data.

In other examples of systems for providing compression in graphics rendering on a computer, the graphics coded module may be further configured to render the tile of pixels such that to render the tile of pixels may include a rasterization including application of at least one of a visibility function or a shading function, and such that to render the tile of pixels may include application of at least one of a super-sampling anti-aliasing technique, a multi-sampling anti-aliasing technique, or a low frequency shading technique, set a number of values in the subset of the plurality of color values to zero, compress, prior to storing the graphics data, at least one of the subset of the plurality of color values or the plurality of index values, wherein compression of the plurality of index values comprises application of a delta-encoding of the plurality of index values, store, in memory, a subset number value associated with the number of color values in the subset, determine a number of bits for the graphics data associated with the subset of the plurality of color values, the associated index values, and the plurality of pixel index values, determine a bit budget, compare the number of bits for the graphics data associated with the subset of the plurality of color values, the associated index values, and the plurality of pixel index values with the bit budget, and, if the number of bits for the graphics data associated with the subset of the plurality of color values, the associated index values, and the plurality of pixel index values is less than the bit budget, store, in memory, the graphics data associated with the subset of the plurality of color values, the associated index values, and the plurality of pixel index values, and, if the number of bits for the graphics data associated with the subset of the plurality of color values, the associated index values, and the plurality of pixel index values is greater than the bit budget, store, in memory, second graphics data comprising the plurality of color values associated with the individual pixels of the tile of pixels such that the bit budget comprises one of a plurality of available bit budgets, access the subset number value and the graphics data, determine the subset of the plurality of values based at least in part on the graphics data such that determination of the subset of the plurality of color values includes at least one of reading a portion of the graphics data or decompressing the portion of the graphics data, determine the plurality of color values associated with individual pixels of the tile of pixels based at least in part on the subset of the plurality of color values, the index values associated with each color value of the subset of the plurality of values, and the plurality of pixel index values. The graphics data codec module may be configured to determine the plurality of color values by determination of the first graphics data associated with the tile of pixels such that the first graphics data may include the plurality of color values, and such that accessing the first graphics data associated with the tile comprises accessing the first graphics data associated with the tile upon a cache evict. The graphics data codec module may be configured to generate the subset of the plurality of color values, associate the index value with each value of the subset of the plurality of values, and determine, for each of the individual pixels, an associated pixel index value by, for each pixel of the individual pixels, determination of whether the color value associated with the current pixel value is in the subset and, if the color value associated with the current pixel value is in the subset, the graphics data codec module may be further configured to associate the index value associated with the color value with the current pixel, and, if the color value associated with the current pixel value is not in the subset, the graphics data compression codec may be further configured to add the color value to the subset, associate an index value with the added color value, and associate the index value associated with the added color value with the current pixel. The plurality of color values may include at least one of low frequency pixel shading color values or multi-sampling anti-aliasing color plane values. The tile of pixels may be 8 pixels wide by 4 pixels high.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for providing compression in graphics rendering comprising:
    determining, via a graphics processing unit comprising a graphics data compression module, a plurality of color values associated with individual pixels of a tile of pixels;
    generating, via the graphics data compression module of the graphics processing unit, a subset of the plurality of color values, wherein the subset of the plurality of color values is generated so as to include only distinct color values without duplication from the plurality of color values associated with the individual pixels across the entire tile of pixels;
    associating, via the graphics data compression module of the graphics processing unit, an index value with each color value of the subset of the plurality of color values so that each non-duplicative distinct color value is associated with a corresponding non-duplicative distinct index value;
    determining, via the graphics data compression module of the graphics processing unit, for each of the individual pixels across the entire tile of pixels, an associated pixel index value to generate a plurality of pixel index values associated with the individual pixels of the tile of pixels;
    storing, in memory, graphics data comprising the subset of the plurality of color values, the associated index values, and the plurality of pixel index values;
    determining, via the graphics data compression module of the graphics processing unit, a number of bits for the graphics data associated with the subset of the plurality of color values, the associated index values, and the plurality of pixel index values;
    determining, via the graphics data compression module of the graphics processing unit, a bit budget, wherein the bit budget comprises one of a plurality of available bit budgets including a tile-based bit budget component based at least in part on the number of bits for the graphics data associated with the tile and a system-based bit budget component based at least in part on a memory bandwidth limitation associated with the system;
    comparing, via the graphics data compression module of the graphics processing unit, the number of bits for the graphics data associated with the subset of the plurality of color values, the associated index values, and the plurality of pixel index values with the bit budget, and
        if the number of bits for the graphics data associated with the subset of the plurality of color values, the associated index values, and the plurality of pixel index values is less than or equal to the bit budget, storing, in memory, the graphics data associated with the subset of the plurality of color values, the associated index values, and the plurality of pixel index values; and
        if the number of bits for the graphics data associated with the subset of the plurality of color values, the associated index values, and the plurality of pixel index values is greater than the bit budget, storing, in memory, second graphics data comprising the plurality of color values associated with the individual pixels of the tile of pixels.

2. The method of claim 1, wherein the plurality of color values comprise at least one of low frequency pixel shading color values or multi-sampling anti-aliasing color plane values.

3. The method of claim 1, wherein determining the plurality of color values comprises accessing first graphics data associated with the tile of pixels, wherein the first graphics data comprises the plurality of color values, and wherein accessing the first graphics data associated with the tile comprises accessing the first graphics data associated with the tile upon a cache evict.

4. The method of claim 1, further comprising:
    storing, in memory, a subset number value associated with the number of color values in the subset;
    accessing the subset number value and the graphics data;
    determining the subset of the plurality of color values based at least in part on the graphics data, wherein determining the subset of the plurality of color values comprises reading a portion of the graphics data;
    determining the index values associated with each color value of the subset of the plurality of color values;
    determining the plurality of pixel index values based at least in part on the graphics data, wherein determining the plurality of pixel index values comprises reading a second portion of the graphics data; and
    determining the plurality of color values associated with individual pixels of the tile of pixels based at least in part on the subset of the plurality of color values, the index values associated with each color value of the subset of the plurality of color values, and the plurality of pixel index values.

5. The method of claim 1, wherein generating the subset of the plurality of color values, associating the index value with each color value of the subset of the plurality of color values, and determining, for each of the individual pixels, the associated pixel index value comprises setting a number of values in the subset of the plurality of values to zero and, for each pixel of the individual pixels, determining whether the color value associated with the current pixel value is in the subset, and if the color value associated with the current pixel value is in the subset, associating the index value associated with the value with the current pixel; and
if the color value associated with the current pixel value is not in the subset:
adding the color value to the subset;
associating an index value with the added color value; and
associating the index value associated with the added color value with the current pixel.

6. The method of claim 1, further comprising:
compressing, prior to storing the graphics data, the subset of the plurality of color values.

7. The method of claim 1, further comprising:
compressing, prior to storing the graphics data, the plurality of pixel index values.

8. The method of claim 1, further comprising:
rendering the tile of pixels, wherein rendering the tile of pixels comprises rasterization comprising applying at least one of a visibility function or a shading function, and wherein rendering the tile of pixels comprises applying at least one of a super-sampling anti-aliasing technique, a multi-sampling anti-aliasing technique, or a low frequency pixel shading technique;
compressing, prior to storing the graphics data, at least one of the subset of the plurality of color values or the plurality of pixel index values, wherein compressing the plurality of pixel index values comprises a delta-encoding of the plurality of index values;
storing, in memory, a subset number value associated with the number of color values in the subset;
accessing the subset number value and the graphics data;
determining the subset of the plurality of color values based at least in part on the graphics data, wherein determining the subset of the plurality of color values comprises at least one of reading a portion of the graphics data or decompressing the portion of the graphics data;
determining the index values associated with each color value of the subset of the plurality of color values;
determining the plurality of pixel index values based at least in part on the graphics data, wherein determining the plurality of pixel index values comprises at least one of reading a second portion of the graphics data or decompressing the second portion of the graphics data; and
determining the plurality of color values associated with the individual pixels of the tile of pixels based at least in part on the subset of the plurality of color values, the index values associated with each value of the subset of the plurality of values, and the plurality of pixel index values,
wherein determining the plurality of color values comprises accessing first graphics data associated with the tile of pixels, wherein the first graphics data comprises the plurality of color values, and wherein accessing the first graphics data associated with the tile comprises accessing the first graphics data associated with the tile upon a cache evict,
wherein generating the subset of the plurality of color values, associating the index value with each color value of the subset of the plurality of color values, and determining, for each of the individual pixels, the associated pixel index value comprises setting a number of values in the subset of the plurality of values to zero and, for each pixel of the individual pixels, determining whether the color value associated with the current pixel value is in the subset, and
if the color value associated with the current pixel value is in the subset, associating the index value associated with the color value with the current pixel; and
if the color value associated with the current pixel value is not in the subset:
adding the color value to the subset;
associating an index value with the added color value; and
associating the index value associated with the added color value with the current pixel;
wherein the plurality of color values comprise at least one of low frequency pixel shading color values or multi-sampling anti-aliasing color plane values, and
wherein the tile of pixels comprises 8 pixels wide by 4 pixels high.

9. A system for providing compression in graphics rendering on a computer, comprising:
a graphics buffer;
a graphics processing unit comprising a graphics data codec module, wherein the graphics processing unit is communicatively coupled to the graphics buffer and wherein the graphics data codec module is configured to:
determine a plurality of color values associated with individual pixels of a tile of pixels;
generate a subset of the plurality of color values, wherein the subset of the plurality of color values is generated so as to include only distinct color values without duplication from the plurality of color values associated with the individual pixels across the entire tile of pixels;
associate an index value with each color value of the subset of the plurality of color values so that each non-duplicative distinct color value is associated with a corresponding non-duplicative distinct index value;
determine, for each of the individual pixels across the entire tile of pixels, an associated pixel index value to generate a plurality of pixel index values associated with the individual pixels of the tile of pixels;
store, in the graphics buffer, graphics data comprising the subset of the plurality of color values, the associated index values, and the plurality of pixel index values;
determine a number of bits for the graphics data associated with the subset of the plurality of color values, the associated index values, and the plurality of pixel index values;
determine a bit budget, wherein the bit budget comprises one of a plurality of available bit budgets including a tile-based bit budget component based at least in part on the number of bits for the graphics data associated with the tile and a system-based bit budget component based at least in part on a memory bandwidth limitation associated with the system;
compare the number of bits for the graphics data associated with the subset of the plurality of color values, the associated index values, and the plurality of pixel index values with the bit budget, and
if the number of bits for the graphics data associated with the subset of the plurality of color values, the associated index values, and the plurality of pixel index values is less than or equal to the bit budget, store, in memory, the graphics data associated with the subset of the plurality of color values, the associated index values, and the plurality of pixel index values; and if the number of bits for the graphics data associated with the subset of the plurality of color values, the associated index values, and the plurality of pixel index values is greater than the bit budget, store, in memory, second graphics data comprising the plurality of color values associated with the individual pixels of the tile of pixels.

10. The system of claim 9, further comprising:
a display device configured to display output image data based at least in part on the graphics data.

11. The system of claim 9, wherein the plurality of color values comprise at least one of low frequency pixel shading color values or multi-sampling anti-aliasing color plane values.

12. The system of claim 9, wherein the graphics data codec module is configured to generate the subset of the plurality of color values, associate the index value with each value of the subset of the plurality of color values, and determine, for each of the individual pixels, an associated pixel index value by, for each pixel of the individual pixels, determination of whether the color value associated with the current pixel value is in the subset, and
    if the color value associated with the current pixel value is in the subset, the graphics data codec module is further configured to associate the index value associated with the color value with the current pixel; and
    if the color value associated with the current pixel value is not in the subset, the graphics data codec module is further configured to:
    add the color value to the subset;
    associate an index value with the added color value; and
    associate the index value associated with the added color value with the current pixel.

13. The system of claim 9, wherein the graphics data codec module is configured to determine the plurality of color values by determination of the first graphics data associated with the tile of pixels, wherein the first graphics data comprises the plurality of color values, and wherein accessing the first graphics data associated with the tile comprises accessing the first graphics data associated with the tile upon a cache evict.

14. The system of claim 9, wherein the graphics data codec module is further configured to:
    compress, prior to storing the graphics data, the subset of the plurality of color values.

15. The system of claim 9, wherein the graphics data codec module is further configured to:
    compress, prior to storing the graphics data, the plurality of index values.

16. The system of claim 9, further comprising:
a display device configured to display output image data based at least in part on the graphics data,
wherein the graphics data codec module is further configured to:
    render the tile of pixels, wherein to render the tile of pixels comprises rasterization comprising application of at least one of a visibility function or a shading function, and wherein to render the tile of pixels comprises application of at least one of a super-sampling anti-aliasing technique, a multi-sampling anti-aliasing technique, or a low frequency pixel shading technique;
    set a number of values in the subset of the plurality of color values to zero;
    compress, prior to storing the graphics data, at least one of the subset of the plurality of color values or the plurality of index values, wherein compression of the plurality of index values comprises application of a delta-encoding of the plurality of index values;
    store, in memory, a subset number value associated with the number of values in the subset;
    access the subset number value and the graphics data;
    determine the subset of the plurality of color values based at least in part on the graphics data, wherein determination of the subset of the plurality of color values comprises at least one of reading a portion of the graphics data or decompressing the portion of the graphics data;
    determine the index values associated with each value of the subset of the plurality of color values;
    determine the plurality of pixel index values based at least in part on the graphics data, wherein determination of the plurality of pixel index values comprises at least one of reading a second portion of the graphics data or decompressing the second portion of the graphics data; and
    determine the plurality of color values associated with the individual pixels of the tile of pixels based at least in part on the subset of the plurality of color values, the index values associated with each value of the subset of the plurality of values, and the plurality of pixel index values,
wherein the graphics data codec module is configured to determine the plurality of values by determination of the first graphics data associated with the tile of pixels, wherein the first graphics data comprises the plurality of color values, and wherein accessing the first graphics data associated with the tile comprises accessing the first graphics data associated with the tile upon a cache evict,
wherein the graphics data codec module is configured to generate the subset of the plurality of color values, associate the index value with each color value of the subset of the plurality of color values, and determine, for each of the individual pixels, an associated pixel index value by, for each pixel of the individual pixels, determination of whether the color value associated with the current pixel value is in the subset, and
    if the color value associated with the current pixel value is in the subset, the graphics data codec module is further configured to associate the index value associated with the color value with the current pixel; and
    if the color value associated with the current pixel value is not in the subset, the graphics data codec module is further configured to:
    add the color value to the subset;
    associate an index value with the added color value; and
    associate the index value associated with the added color value with the current pixel;
wherein the plurality of color values comprise at least one of low frequency pixel shading color values or multi-sampling anti-aliasing color plane values, and wherein the tile of pixels comprises 8 pixels wide by 4 pixels high.

17. At least one non-transitory machine readable medium comprising a plurality of instructions that in response to being executed on a computing device, cause the computing device to provide compression in graphics rendering by:
    determining a plurality of color values associated with individual pixels of a tile of pixels;
    generating a subset of the plurality of color values, wherein the subset of the plurality of color values is generated so as to include only distinct color values without duplication from the plurality of color values associated with the individual pixels across the entire tile of pixels;

associating an index value with each color value of the subset of the plurality of color values so that each non-duplicative distinct color value is associated with a corresponding non-duplicative distinct index value;

determining, for each of the individual pixels across the entire tile of pixels, an associated pixel index value to generate a plurality of pixel index values associated with the individual pixels of the tile of pixels;

storing, in memory, graphics data comprising the subset of the plurality of color values, the associated index values, and the plurality of pixel index values determining a number of bits for the graphics data associated with the subset of the plurality of color values, the associated index values, and the plurality of pixel index values;

determining a bit budget, wherein the bit budget comprises one of a plurality of available bit budgets including a tile-based bit budget component based at least in part on the number of bits for the graphics data associated with the tile and a system-based bit budget component based at least in part on a memory bandwidth limitation associated with the system;

comparing the number of bits for the graphics data associated with the subset of the plurality of color values, the associated index values, and the plurality of pixel index values with the bit budget, and if the number of bits for the graphics data associated with the subset of the plurality of color values, the associated index values, and the plurality of pixel index values is less than or equal to the bit budget, storing, in memory, the graphics data associated with the subset of the plurality of color values, the associated index values, and the plurality of pixel index values; and if the number of bits for the graphics data associated with the subset of the plurality of color values, the associated index values, and the plurality of pixel index values is greater than the bit budget, storing, in memory, second graphics data comprising the plurality of color values associated with the individual pixels of the tile of pixels.

18. The non-transitory machine readable medium of claim 17, wherein generating the subset of the plurality of color values, associating the index value with each color value of the subset of the plurality of color values, and determining, for each of the individual pixels, the associated pixel index value comprises setting a number of values in the subset of the plurality of values to zero and, for each pixel of the individual pixels, determining whether the color value associated with the current pixel value is in the subset, and if the color value associated with the current pixel value is in the subset, associating the index value associated with the value with the current pixel; and if the color value associated with the current pixel value is not in the subset:

adding the color value to the subset;

associating an index value with the added color value; and associating the index value associated with the added color value with the current pixel.

19. The non-transitory machine readable medium of claim 17, further comprising instructions that in response to being executed on the computing device, cause the computing device to provide compression in graphics rendering by:

compressing, prior to storing the graphics data, at least one of the subset of plurality of color values or the plurality of pixel index values.

20. The non-transitory machine readable medium of claim 17, wherein the plurality of color values comprise at least one of low frequency pixel shading color values or multi-sampling anti-aliasing color plane values.

21. The non-transitory machine readable medium of claim 17, further comprising instructions that in response to being executed on the computing device, cause the computing device to provide compression in graphics rendering by:

rendering the tile of pixels, wherein rendering the tile of pixels comprises rasterization comprising applying at least one of a visibility function or a shading function, and wherein rendering the tile of pixels comprises applying at least one of a super-sampling anti-aliasing technique, a multi-sampling anti-aliasing technique, or a low frequency pixel shading technique;

compressing, prior to storing the graphics data, at least one of the subset of the plurality of color values or the plurality of pixel index values, wherein compressing the plurality of pixel index values comprises a delta-encoding of the plurality of index values;

storing, in memory, a subset number value associated with the number of color values in the subset;

accessing the subset number value and the graphics data;

determining the subset of the plurality of color values based at least in part on the graphics data, wherein determining the subset of the plurality of color values comprises at least one of reading a portion of the graphics data or decompressing the portion of the graphics data;

determining the index values associated with each color value of the subset of the plurality of color values;

determining the plurality of pixel index values based at least in part on the graphics data, wherein determining the plurality of pixel index values comprises at least one of reading a second portion of the graphics data or decompressing the second portion of the graphics data; and determining the plurality of color values associated with the individual pixels of the tile of pixels based at least in part on the subset of the plurality of color values, the index values associated with each value of the subset of the plurality of values, and the plurality of pixel index values, wherein determining the plurality of color values comprises accessing first graphics data associated with the tile of pixels, wherein the first graphics data comprises the plurality of color values, and wherein accessing the first graphics data associated with the tile comprises accessing the first graphics data associated with the tile upon a cache evict, wherein generating the subset of the plurality of color values, associating the index value with each color value of the subset of the plurality of color values, and determining, for each of the individual pixels, the associated pixel index value comprises setting a number of values in the subset of the plurality of values to zero and, for each pixel of the individual pixels, determining whether the color value associated with the current pixel value is in the subset, and if the color value associated with the current pixel value is in the subset, associating the index value associated with the color value with the current pixel; and if the color value associated with the current pixel value is not in the subset:

adding the color value to the subset;
associating an index value with the added color value; and
associating the index value associated with the added color value with the current pixel;
wherein the plurality of color values comprise at least one of low frequency pixel shading color values or multi-sampling anti-aliasing color plane values, and
wherein the tile of pixels comprises 8 pixels wide by 4 pixels high.

* * * * *